(12) United States Patent
Katikaneni et al.

(10) Patent No.: US 7,455,923 B2
(45) Date of Patent: Nov. 25, 2008

(54) FUEL SUPPLY ASSEMBLY FOR SUPPLYING PROPANE FUEL TO A FUEL CELL ASSEMBLY AND FUEL CELL SYSTEM EMPLOYING SAME

(75) Inventors: Sai P. Katikaneni, Brookfield, CT (US); Joseph M. Daly, Bethel, CT (US); Mohammad Farooque, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 175 days.

(21) Appl. No.: 11/469,527

(22) Filed: Sep. 1, 2006

(65) Prior Publication Data

US 2008/0057366 A1  Mar. 6, 2008

(51) Int. Cl.
*H01M 8/06* (2006.01)
(52) U.S. Cl. .......................... 429/17; 429/20
(58) Field of Classification Search .................. 429/17, 429/19, 20
See application file for complete search history.

(56) References Cited

U.S. PATENT DOCUMENTS

| | | | |
|---|---|---|---|
| 5,725,964 A * | 3/1998 | Huppmann | 429/20 |
| 6,694,955 B1 * | 2/2004 | Griffiths et al. | 123/516 |
| 6,769,418 B1 * | 8/2004 | Reddy | 123/520 |
| 6,905,791 B2 * | 6/2005 | Busenbender | 429/17 X |
| 7,063,732 B2 * | 6/2006 | Katikaneni et al. | 95/135 |

* cited by examiner

Primary Examiner—Stephen J. Kalafut
(74) Attorney, Agent, or Firm—Cowan, Liebowitz & Latman, P.C.

(57) ABSTRACT

A fuel supply assembly which receives a supply of liquid fuel feedstock including hydrocarbons having higher and lower hydrocarbon content and high molecular weight sulfur-containing compounds, the higher hydrocarbon content and high molecular weight sulfur containing compounds being less volatile that the lower hydrocarbon content. The fuel supply assembly supplies fuel to a fuel cell assembly and has a housing unit adapted to house the liquid fuel feedstock so that the liquid fuel feedstock is subjected to vaporization conditions to allow at least a portion of the liquid fuel feedstock to vaporize to form fuel feedstock vapor, the vaporization conditions being such that the concentration of lower hydrocarbon content is higher and the concentration of higher hydrocarbon content and high molecular weight sulfur containing compounds is lower in the fuel feedstock vapor than in the liquid fuel feedstock. A collecting unit is also provided in the fuel supply assembly and the collecting unit has a first end coupled with the housing unit and a second end adapted to be coupled with the fuel cell assembly which collects the fuel feedstock vapor from the housing unit to make the fuel feedstock vapor available to the fuel cell assembly.

30 Claims, 6 Drawing Sheets

FUEL SUPPLY ASSEMBLY FOR SUPPLYING PROPANE FUEL TO A FUEL CELL ASSEMBLY AND FUEL CELL SYSTEM EMPLOYING SAME

INCORPORATION BY REFERENCE

This application hereby incorporates by reference the entire disclosures of U.S. patent application Ser. No. 10/797,698, filed Nov. 2, 2004, and Ser. No. 10/628,653, filed Jul. 28, 2003.

BACKGROUND OF THE INVENTION

This invention relates to processing of fuel feedstocks containing hydrocarbon for use in fuel cell systems and, in particular, to fuel processing assemblies for performing processing of propane fuel feedstocks.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. Molten carbonate fuel cells operate by passing a reactant fuel gas through the anode, while oxidizing gas is passed through the cathode. In order to produce a useful power level, a number of individual fuel cells are stacked in series with an electrically conductive separator plate between each cell.

Current fuel cells require as the reactant gas a clean gas composed of hydrogen or a mixture of hydrogen and carbon monoxide. The reactant fuel gas is generally developed from a hydrocarbon-containing feedstock using a reforming process. Hydrocarbon-containing feedstocks such as natural gas, peak shaving gas, digester gas and coal bed methane usually contain substantial amounts of lower hydrocarbons, i.e. hydrocarbons with 3 or less carbons ($C_2$, $C_3$), such as methane, as well as small amounts of hydrogen, carbon dioxide, nitrogen and higher hydrocarbons ($C_4$, $C_5$, etc., i.e., $C_4+$). Other hydrocarbon gases such as HD-5 propane or propylene-spiked propane gases usually contain substantial amounts of higher hydrocarbons, such as propane or propylene, traces of butane, pentane and a small amounts of hydrogen, carbon dioxide, and lower hydrocarbons.

Fuel feedstocks are usually subjected to pre-processing to reduce or eliminate the higher hydrocarbons and to convert a portion of the lower hydrocarbons to methane, hydrogen and carbon dioxide. Conventional pre-processing is carried out using a deoxidizer assembly followed by a pre-reforming assembly. The deoxidizer assembly reduces the concentration of oxygen in the fuel feedstock before the feedstock enters the pre-reforming assembly. This protects the catalyst (usually, a nickel-based catalyst) used in the pre-reforming assembly, which otherwise would be deactivated in the presence of oxygen.

In the pre-reforming assembly, the reforming reaction is a conversion process which may inadvertently result in carbon formation based on fuel composition and steam. Carbon formation is of a particular concern when the fuel feedstock contains propylene, since the propensity to form carbon increases as the concentration of propylene increases. The carbon which is produced deposits at the active sites of the reforming catalyst of the pre-reforming assembly, thereby deactivating the catalyst. This reduces the life of the pre-reforming assembly.

In order to reduce carbon formation in conventional pre-reforming assemblies, special catalysts either containing alkali or based on an active magnesia support have been proposed. Another technique is to use adiabatic processing. In such case, a fixed bed adiabatic pre-reforming assembly converts the higher hydrocarbon content at low temperature with steam into methane, hydrogen and carbon oxides.

Fuel feedstocks supplied to the conventional pre-reforming assembly must be supplied with additional hydrogen from a hydrogen supply. This is required to provide a sufficient concentration of hydrogen in the feedstocks to maintain a reducing environment for the reforming catalyst, thereby maintaining the catalytic activity.

Moreover, some fuel feedstocks, particularly propylene-containing fuel feedstocks, generally have a high concentration of sulfur-containing compounds including high molecular weight sulfur-containing compounds. These compounds tend to deactivate the reforming catalysts in the pre-reforming assembly. Although fuel feedstocks are typically desulfurized in a desulfurizer unit before being carried to the pre-reforming assembly, high sulfur concentrations as well as propylene in the fuel feedstocks reduce the capacity of the desulfurizer unit.

As can be appreciated, conventional pre-processing of fuel feedstocks is complex and costly due to the need for additional units or special components for supplying hydrogen, for reducing carbon formation and for removing propylene and an additional unit to remove oxygen entering into the pre-reforming assembly. In addition, the reduced capacity of the desulfurizer unit when used to clean up the fuel with high sulfur content results in additional operating costs due to the frequent need to replace or regenerate the desulfurizer unit.

It is therefore an object of the present invention to provide a fuel supply assembly which assists in reducing the sulfur content of the fuel feedstock for a fuel cell assembly.

It is a further object of the invention to provide a fuel supply assembly of the aforementioned which is adapted to process propane containing fuel.

It is another object of the invention to provide a fuel cell system which includes the aforementioned fuel supply assembly and a pre-processing assembly specifically adapted to preprocess propane fuel.

SUMMARY OF THE INVENTION

The above and other objects are realized in a fuel supply assembly which receives a supply of liquid fuel feedstock including hydrocarbons having higher and lower hydrocarbon content and high molecular weight sulfur-containing compounds, the higher hydrocarbon content and high molecular weight sulfur containing compounds being less volatile that the lower hydrocarbon content. The fuel supply assembly supplies fuel to a fuel cell assembly and comprises a housing unit adapted to house the liquid fuel feedstock so that the liquid fuel feedstock is subjected to vaporization conditions to allow at least a portion of the liquid fuel feedstock to vaporize to form fuel feedstock vapor, the vaporization conditions being such that the concentration of lower hydrogen content is higher and the concentration of higher hydrocarbon content and high molecular weight sulfur containing compounds is lower in the fuel feedstock vapor than in the liquid fuel feedstock. The fuel supply assembly also includes a collecting unit having a first end coupled with the housing unit and a second end adapted to be coupled with the fuel cell assembly which collects the fuel feedstock vapor from the housing unit to make the fuel feedstock vapor available to the fuel cell assembly.

In certain forms of the fuel supply assembly the assembly may further comprise a drawing unit coupled with the housing unit for drawing liquid fuel feedstock from the housing unit; and a flow stabilizer unit for maintaining a predetermined vapor pressure and vaporization rate in the housing unit, the flow stabilizer unit having an inlet coupled with the drawing unit and an outlet coupled with the housing unit. The flow stabilizer unit may optionally include a heating unit and the drawing unit optionally may comprise a fuel flow control member for controlling the flow of the liquid fuel feedstock drawn by the drawing unit from the housing to the flow stabilizer unit such that no fuel feedstock flows to the fuel flow stabilizer unit during drawing of the liquid fuel feedstock by the drawing unit for rinsing of the housing unit.

The drawing unit may also optionally be further adapted to draw substantially all the liquid fuel feedstock from the housing unit to rinse the housing unit if the level of liquid fuel feedstock in the housing unit reaches a predetermined level or less. A usable predetermined level is 20% of a volume of the housing unit.

Also, in some forms of the supply assembly, the liquid fuel feedstock comprises a propane containing liquid fuel feedstock, wherein propane is included in the lower hydrocarbon content.

A fuel cell system may be formed with the fuel supply assembly and the fuel cell assembly. This system may also optionally further include a pre-heater and humidifier assembly for combining the fuel feedstock vapor with input water to provide humidified fuel vapor having a predetermined steam to carbon ratio, e.g. 3, and for pre-heating the humidified fuel vapor to a predetermined temperature, e.g. 320° C.; a desulfurizer having an inlet coupled with the second end of the collecting unit of the fuel supply assembly and an outlet coupled with the humidifying and preheating assembly, wherein the desulfurizer receives fuel feedstock vapor from the collecting unit of the fuel supply assembly and removes sulfur-containing compounds from the fuel feedstock vapor; and a pre-processing assembly that receives humidified pre-heated fuel feedstock vapor from the humidifying and pre-heating assembly and is adapted to pre-reform the fuel feedstock vapor so as to reduce the propane and the hydrocarbons having a higher hydrocarbon content in the fuel feedstock vapor to provide hydrogen and hydrocarbons having a lower hydrocarbon content.

A method for use with the liquid fuel feedstock and fuel cell assembly is also disclosed.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
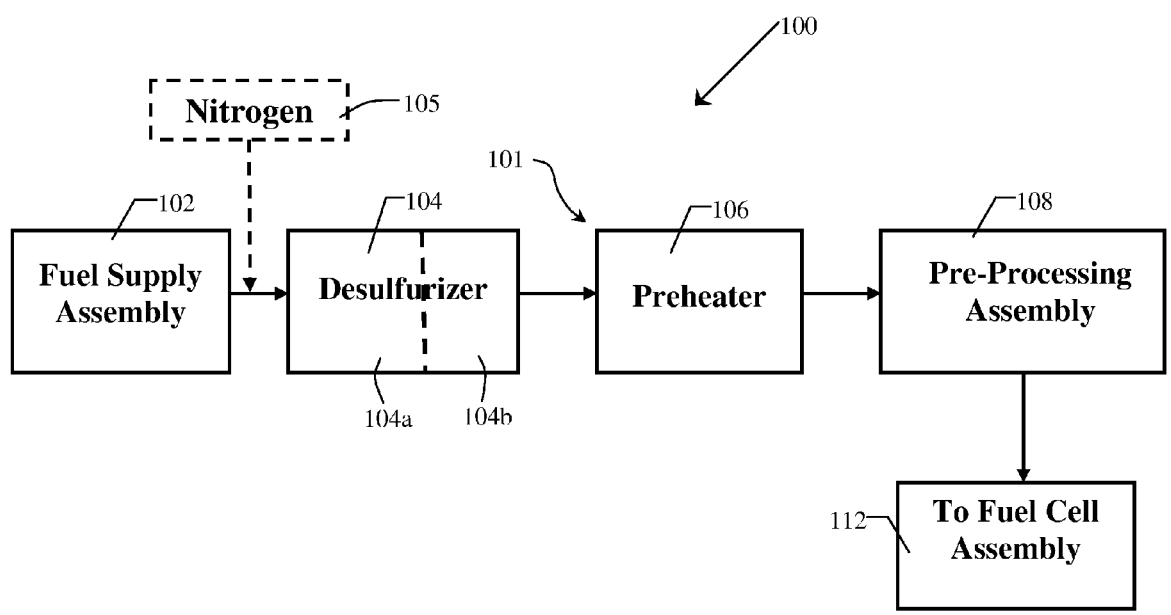
FIG. 1 shows a fuel cell system for processing fuel feedstocks.

FIG. 1 shows a fuel cell system 100 comprising a fuel delivery assembly 101 having a fuel supply assembly 102, a desulfurizer 104 and a pre-processing assembly 108. The fuel delivery assembly 101 delivers hydrogen-rich fuel to a fuel cell assembly 112.

The fuel supply assembly 102 of the fuel delivery assembly 101 provides a fuel feedstock containing methane, ethane, propane, carbon oxides ($CO$ and $CO_2$) and hydrocarbons having a higher hydrocarbon content, such as, for example $C_4+$ hydrocarbons, and amounts of oxygen and hydrogen. Although the fuel delivery assembly 101 of the fuel cell system 100 is suitable for delivering and processing a variety of fuel feedstocks including natural gas, peak shaving gas, digester gas or coal bed methane, it is particularly suited for delivery and processing of HD-5 propane gas or HD-5+ propane gas spiked with propylene.

The fuel feedstock from the fuel supply 102 is passed to the desulfurizer 104, where sulfur-containing compounds in the fuel feedstock are physically and/or chemically removed. Desulfurized fuel feedstock then flows to a humidifier and pre-heater assembly 106 where the fuel feedstock is combined with water and the humidified fuel feedstock is pre-heated to a suitable temperature, e.g. approximately between 320 and 500° C., before being carried to the pre-processing assembly 108. When the fuel feedstock comprises HD-5 propane gas or HD-5+ propane gas spiked with propylene, the fuel feedstock is mixed with a predetermined amount of water in the humidifier and pre-heater assembly 106 so that the steam to carbon ratio of the humidified fuel feedstock is accurately controlled. For example, the predetermined amount of water mixed with the HD-5 propane gas is about 9 moles per 1 mole of propane gas, such that the steam to carbon ratio is maintained at about 3. In contrast, the typical amount of water required for mixing with natural gas fuel feedstock is about 2 moles per 1 mole of natural gas. In addition, the suitable temperature to which the humidified fuel feedstock comprising HD-5 propane or HD-5+ propane spiked with propylene is preheated in the humidifier and pre-heater assembly 106 is lower than the temperature to which humidified natural gas needs to be preheated. In particular, preheating the humidified propane or propane spiked with propylene to about 320° C. is sufficient for the subsequent processing in the pre-processing assembly 108, while the humidified natural gas fuel needs to be pre-heated to about 450° C. to achieve similar results in the pre-processing assembly 108.

As mentioned above, the humidified and pre-heated fuel feedstock is carried to the pre-processing assembly 108 where it undergoes pre-processing. Pre-processed fuel feedstock exiting the assembly 108 is suitable for use in a fuel cell assembly 112. In the fuel cell assembly 112, the hydrogen-rich fuel undergoes an electrochemical reaction to produce power.

Figure 2:
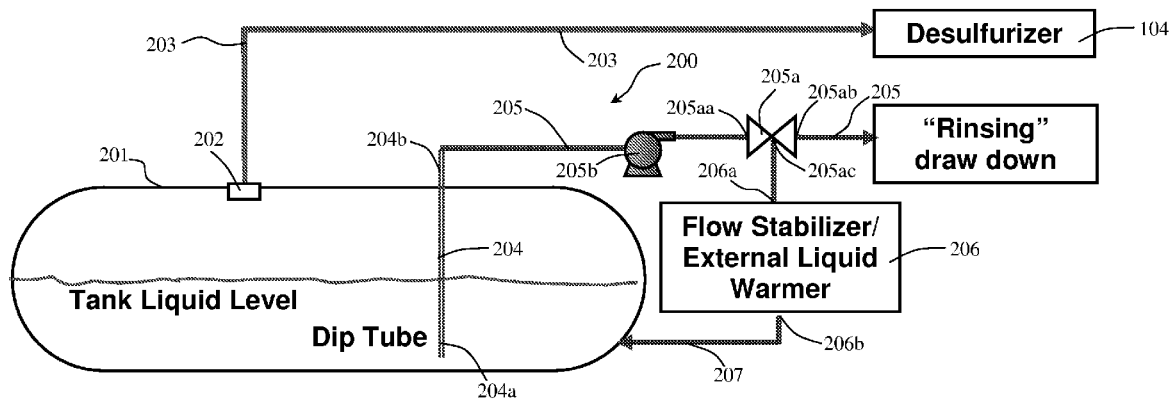
FIG. 2 shows a detailed schematic view of the fuel supply assembly of the fuel cell system of FIG. 1.

Fuel feedstock is delivered from the fuel supply assembly 102 to the desulfurizer 104 in a form of a vapor so as to reduce the amount of sulfur entering and having to be removed by the desulfurizer 104 and to prolong the desulfurizer's operating life. A detailed schematic view of the fuel supply assembly 102 is shown in FIG. 2. As shown, the fuel supply assembly 102 includes a fuel housing unit 201, such as a fuel tank, for housing therein fuel feedstock in liquid and in gaseous or vapor state. The fuel supply assembly 102 also includes a vapor takeoff member 202 coupled with the fuel housing unit 201 for collecting fuel feedstock vapor, i.e. fuel feedstock in gaseous state, in the housing unit 201 and for transferring the fuel feedstock vapor out of the housing unit 201 via a coupling assembly 203 which couples the vapor takeoff member 202 with the desulfurizer 104.

As also shown in FIG. 2, the fuel supply assembly includes drawing unit 200 having a drawing member 204, such as a dip tube, a portion of which is enclosed by the housing unit 201. In particular, a first end 204a of the drawing member 204 is inserted into the housing unit 201 such that the end 204a extends below the liquid fuel feedstock level and is in contact with, and is preferably immersed in the liquid fuel feedstock. A second end 204b of the drawing member 204 extends outside of the housing unit 201 and is coupled with a coupling assembly 205 of the drawing unit 200. The drawing member 204 is used to draw out the liquid fuel feedstock from the housing unit 201 through the first end 204a and to transfer the drawn fuel feedstock out of the housing unit 201 to the suction unit 205b of the coupling assembly 205 via the second end 204b of the drawing member 204. As described in more detail herein below, drawing of the liquid fuel feedstock through the drawing member 204 may be used to rinse or clean the fuel supply assembly 102, and in particular to rinse the fuel housing unit 201.

Also, when not being used to rinse the housing unit, the liquid fuel feedstock drawn using the drawing member 204 may be passed through a flow stabilizer unit 206 and then returned to the fuel housing unit 201 so as to maintain the vapor pressure in the housing unit 201 at an optimum vaporization rate. To this end, the flow stabilizer unit 206 has its inlet 206a coupled with the drawing member 204 by the coupling assembly 205 and its outlet 206b coupled with the housing unit 201 by a coupling assembly 207. The flow stabilizer unit 206 includes a heating unit for heating the liquid fuel feedstock so that when the liquid fuel feedstock is returned to the housing unit 201, optimal vapor pressure is maintained.

A three-way valve 205a having valve openings 205aa, 205ab and 205ac can be used with the coupling assembly 205 in order to control the direction of the fuel flow through the coupling assembly 205. In particular, when the housing unit 201 is being rinsed or cleaned, the valve openings 205aa and 205ab are opened, while the valve opening 205ac is closed such that the fuel being drawn by the drawing member 204 is removed from the fuel supply assembly 102. During the operation of the vapor takeoff unit 202 of the fuel supply assembly 102, i.e., when the housing unit is not being rinsed, the valve openings 205aa and 205cc are opened, while the valve opening 205ab remains closed, such that the fuel being drawn by the drawing member 204 passes to the flow stabilizer unit 206 through the coupling assembly 205.

The fuel supply assembly 102 of FIG. 2 limits the amount of sulfur-containing compounds that are present in the fuel supplied to the desulfurizer 104. In particular, as can be seen in Table 1 herein below, which provides boiling points of HD-5 propane gas components, high molecular weight sulfur-containing compounds and higher hydrocarbons are generally less volatile than fuel compounds:

TABLE 1

| HD-5 Propane Gas Component | Boiling Point |
| --- | --- |
| Propane | −42° C. |
| Propylene | −47° C. |
| Ethane | −88° C. |

TABLE 1-continued

| HD-5 Propane Gas Component | Boiling Point |
| --- | --- |
| Butane | −0.5° C. |
| Ethyl Mercaptan | 35° C. |
| Methyl Mercaptan | 6.2° C. |

Accordingly, the liquid fuel feedstock, if subjected to vaporization conditions which allow substantially only the lower hydrocarbons ($C_2$, $C_3$) to vaporize, will provide a fuel feedstock vapor which contains a higher concentration of the lower hydrocarbons and a lesser or lower concentration of high molecular weight sulfur-containing compounds (polymerized thiopene, sulfides and mercaptans) and higher hydrocarbons ($C_4+$) such as butane than the liquid fuel. The particular vaporization conditions to produce this result will, of course, depend on the environment in which the housing unit 201 is placed and also on any external means, such as flow stabilizer unit 206, used to heat the liquid fuel feedstock.

Typically, environmental temperatures in the range of 45° to 120° F. will heat the tank 201 sufficiently enough so that substantially only the lower hydrocarbons are vaporized through natural vaporization. These temperatures will also typically result in a desired vaporization rate of 10-15 psig. If the environment is severe and these temperatures are not normally reached external means might be additionally required to heat the liquid fuel feedstock to the temperatures needed to result in substantial vaporization of the lower hydrocarbons without significant amounts of the higher hydrocarbons and high molecular weight sulfur containing hydrocarbons being vaporized, while also achieving the desired vaporization rate. Additionally, if higher temperatures have to be used to provide the desired vaporization rate, the realization of this vaporization rate will have to be traded off against an increased amount of higher hydrocarbons and high molecular weight sulfur containing compounds in the resultant vapor.

As above-indicated, the fuel feedstock vapor collected from the housing unit 201 by the vapor take-off unit 204 results in a supply of fuel that is richer in lower or light hydrocarbon components and contains significantly smaller amounts of high molecular weight sulfur compounds than the liquid fuel feedstock. In particular, it has been determined that by subjecting the liquid fuel feedstock to the temperature range above-mentioned, the amount of high molecular weight sulfur-containing compounds in the fuel feedstock vapor (about 3.6 to 23 ppm) is approximately 10 times less than the amount of such compounds in the liquid fuel feedstock (about 35-40 ppm).

Figure 3:
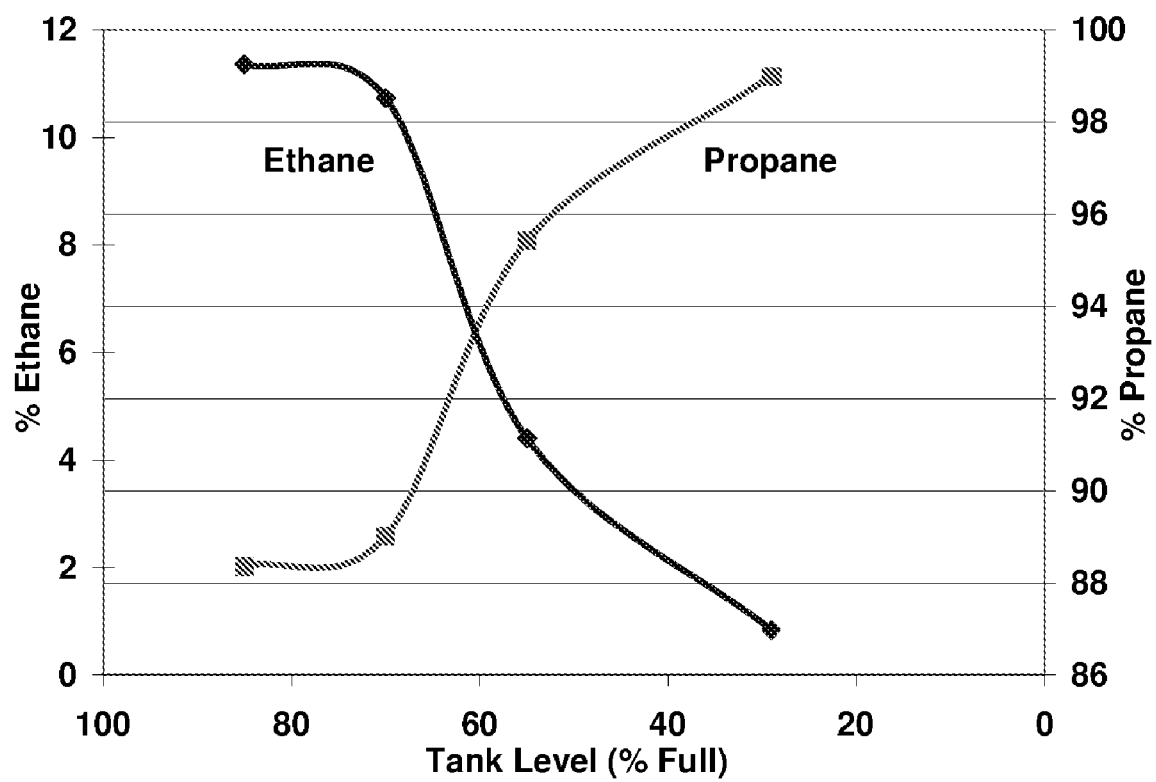
FIG. 3 shows a graph illustrating changes in concentrations of ethane and propane in HD-5 fuel feedstock as a housing unit of the fuel supply assembly of FIG. 2 is depleted.

As can be appreciated, as the fuel feedstock vapor is transferred out of the housing unit 201 and more fuel feedstock vapor is produced in the housing unit 201 under the above-mentioned vaporization conditions, the concentrations of high molecular weight sulfur-containing compounds left in the liquid fuel feedstock increase. Moreover, the composition of the liquid fuel feedstock changes as the fuel feedstock in the housing unit 201 is depleted. FIG. 3 shows a graph illustrating changes in concentrations of ethane and propane in HD-5 liquid fuel feedstock as the housing unit is depleted. In FIG. 3, the X-axis represents the percentage of fuel feedstock fill in the housing unit 201, while the Y-axis represents the percentage of ethane and propane concentrations in the HD-5 liquid fuel feedstock. As shown, the concentration of ethane in the HD-5 liquid fuel feedstock decreases as the housing unit 201 is depleted of fuel, while the concentration of propane increases. This is due to the lighter hydrocarbons, e.g. methane, ethane, being more volatile and vaporizing to a significantly greater degree than the heavier hydrocarbons such as propane and butane, as discussed above.

In order to avoid significant increases in the concentrations of high molecular weight sulfur-containing compounds and heavier hydrocarbons in the liquid fuel feedstock as the fuel housing unit 201 is depleted, it is preferred in operating the fuel supply assembly 102 that the housing unit 201 is rinsed or cleaned. In addition, no fuel feedstock vapor should be collected after the fuel feed stock fill level of the housing unit 201 has been reduced due to vaporization below a predetermined level which upon further vaporization will result in a fuel feedstock vapor having undesirable concentrations of higher hydrocarbons and high molecular weight sulfur-containing compounds. A suitable predetermined level is about a 20% fill level. Accordingly, when the fuel feedstock fill level reaches this level or less, the fuel feedstock is removed from the housing unit 201 through the drawing member 204 via the coupling assembly 205, thereby rinsing or cleaning the housing unit 201 by removing the liquid fuel feedstock containing higher levels of sulfur and heavier hydrocarbons. During the removal of this fuel feedstock from the housing unit 201, the valve portions 205aa and 205ab of the valve 205a are open, while the portion 205ac is closed so as to allow the fuel feedstock to be taken out of the assembly 102. The housing unit 201 is then refilled with a new supply of fuel feedstock and natural fuel vapor generation occurs so that fuel vapor collection can be resumed. The refilling of the housing unit 201 may be accomplished by coupling the drawing member 204 with the new fuel feedstock supply.

In particular, the refilling can be performed using the drawing member 204 to fill the entire housing unit 201. This can be brought about through the use of the drawing assembly 205 operated in reverse to draw the new fuel supply to the tube 204 and into the unit. It can also be achieved by supplying the new fuel to a separate fill spout (not shown) which is connected to the drawing tube. As an alternative to refilling the unit, the entire unit can be replaced with an already fully filled unit.

After the unit is full or replaced with a full unit, the liquid fuel feedstock will be taken from the unit as fuel feedstock vapor described above. It should be noted that although only one housing unit 201 is shown in FIG. 1, additional housing units can be used. Also, unit size can be adjusted based on the liquid fuel feedstock volume required for fuel cell assembly 112 operation. For example, two 2000 gallon units can hold a liquid fuel feedstock supply for approximately one week of such operation. If multiple units are used, the units can be piped in a lead-lag system and while a first unit is under use, the other unit will be used for supply to the fuel cells and vice versa.

As discussed above, fuel feedstock vapor collected from the housing unit 201 is passed to the desulfurizer 104 via the coupling assembly 203 for removal of any sulfur-containing compounds present in the vapor. A suitable desulfurizer 104 which may be employed in the fuel delivery system 101 is described in a commonly assigned application Ser. No. 10/628,653, the entire disclosure of which is incorporated herein by reference. In particular, the desulfurizer 104 preferably comprises a plurality of catalyst beds, such that the fuel gas vapor first passes through one of the beds and thereafter through the other bed or beds. The desulfurizer 104 schematically shown in FIG. 1 includes a first catalyst bed 104a and a second catalyst bed 104b and, if the desulfurizer of '653 application is employed, the first bed 104a comprises an activated carbon adsorbent or a copper-chromium-based activated carbon adsorbent, while the second bed 104b comprises a zeolite, such as a sodium-zeolite adsorbent.

In particular, an illustrative embodiment of the desulfurizer 104 includes a first bed 104a comprising activated carbon adsorbent RGM-1 or RGM-3 manufactured by NORIT Americas Inc. and a second bed 104b following the first bed 104a along the direction of the fuel flow comprising sodium-zeolite adsorbent CNG-1 manufactured by Engelhard Corporation. In this illustrative example, the volume of the first bed 104a is 11 ft$^3$ while the volume of the second bed 104b is 6 ft$^3$. The first bed 104a is adapted to remove high molecular weight organic sulfur-containing compounds such as mercaptans, thiophene and tetrahedron thiophene, and inorganic sulfur-containing compounds such as carbonyl sulfide and hydrogen sulfide as the fuel gas is carried through the bed. The second bed 104b is adapted to remove low molecular weight organic sulfur-containing compounds having less than or equal to 65 molecular weight, including, but not limited to, dimethyl sulfide, ethyl methyl sulfide, methyl mercapatan and ethyl mercaptans. Ethyl mercapatn is used as odorant for HD-5 fuel. Ethyl mercaptan is a light organic molecule that can be trapped by using CNG-1 zeolite adsorbent.

As mentioned above and as schematically shown in FIG. 1, fuel feedstock from the fuel supply assembly 102 carried to the desulfurizer 104 through the coupling assembly 203 first passes through the first bed 104a and thereafter passes through the second bed 104b. Because the RGM catalyst in the first bed 104a may become hot when the fuel first enters the first bed 104a, the fuel may be first mixed with nitrogen from a nitrogen supply 105 in a mixing unit (not shown for purposes of simplicity and clarity) before being passed to the desulfurizer 104 so as to limit the temperature increase. The heat will be generated in the desulfurizer vessel due to heat of adsorption of hydrocarbons such as propane and other higher hydrocarbons. The heat will be generated until it reaches to saturation. To avoid excessive heat in the vessel, nitrogen gas is used as a purge gas along with fuel so that the sulfur-containing compounds will not desorb from the carbon bed surface.

Figure 4:
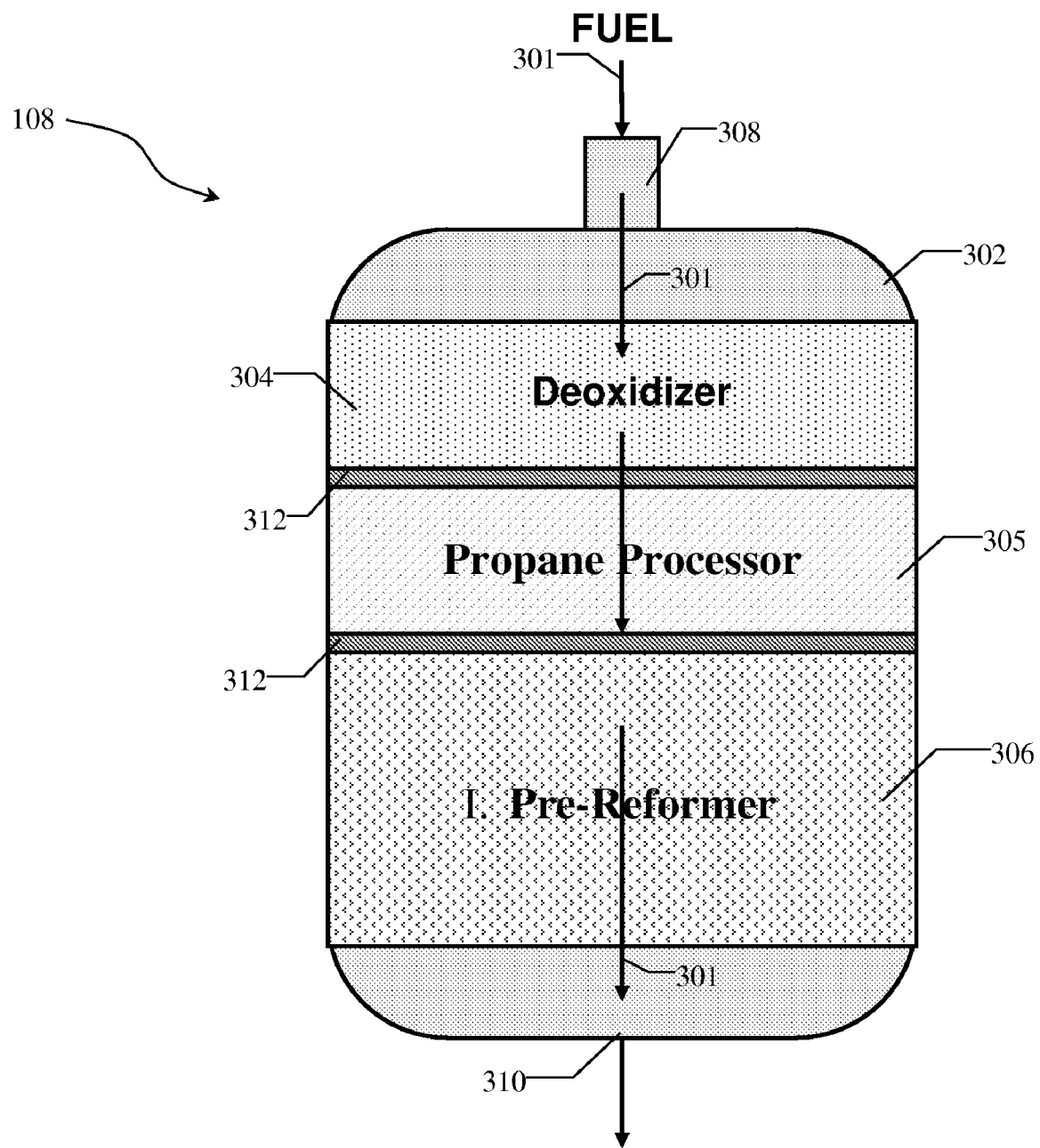
FIG. 4 shows a detailed schematic view of a fuel pre-processing assembly of the fuel cell system of FIG. 1.

After sulfur-containing compounds are removed from the fuel feedstock, the fuel is passed from the desulfurizer 104 to the preheater 106 where the fuel is heated to a predetermined temperature and thereafter to the pre-processing assembly 108. A detailed schematic view of one embodiment of the pre-processing assembly 108 is shown in FIG. 4.

As shown, the pre-processing assembly 108 includes three fuel processing units in the form of a deoxidizer bed 304, a propane processor bed 305 and a pre-reforming bed 306. These beds are arranged or housed in a common vessel 302 having an inlet 308 for receiving the preheated fuel feedstock from the preheater 106 and an outlet 310 for discharging the pre-processed fuel feedstock to the fuel cell assembly 112.

As shown, the propane processor bed 305 is arranged to follow the deoxidizer bed 304 along the flow path 301 of the feedstock, while the pre-reforming bed 306 is arranged to follow the propane processor bed 305. Also, porous members, shown as screens 312 which typically can be made of Nickel mesh having a mesh size of 10-14, separate the beds and provide support for the beds 304, 305. The pre-processing bed 306, in turn, is supported on the lower surface 302a of the vessel 302.

The deoxidizer bed 304 comprises a deoxidizing catalyst which typically might be Pt/Pd on Alumina, or G-74D, manufactured by Sud Chemie Inc. Other catalysts such as Pt—Rh based catalysts and Rh—Pd based Alumina catalysts also may be used.

The propane processor bed 305 comprises a nickel-based carbon resistant catalyst doped with promoters such as cerium oxide, lanthanum oxide, palladium, platinum, or a combination of these compounds. An example of a suitable nickel-based carbon resistant, or anti-coking, catalyst is FCR-HC59 manufactured by Sud Chemie.

The catalyst used in the pre-reforming bed 306 may be a standard nickel based catalyst. Examples are nickel-based alumina catalysts, or C11-PR catalyst, manufactured by Sud-Chemie Inc. Additionally, other nickel-based catalysts such as CRG-F and CRG-LH, manufactured by Johnson Matthey or G-180 manufactured by BASF may likewise be used.

The shapes of the catalysts used in both beds may vary. For example, in the case shown, pellet-shaped catalysts are employed in the deoxidizer bed 304, the propane processor bed 305 and the pre-reforming bed 306. In addition, monolith-based catalyst structures, comprising a ceramic monolith substrate with a catalyst coating, are suitable for use in each bed.

As mentioned above, the pre-processing assembly 108 reduces or substantially eliminates the higher hydrocarbon content and the oxygen content in the fuel feedstock. It also reduces the lower hydrocarbon content and increases the hydrogen content in the feedstock. Due to the arrangement of the deoxidizer, propane processing and pre-reforming beds 304, 305 and 306 in the common vessel 302, the pre-processing reduces the possibility of deactivating the catalysts in the beds and is carried out without the need of adding hydrogen from a hydrogen supply to the fuel feedstock.

In particular, the catalyst of the deoxidizer bed 304 facilitates the removal of oxygen from the fuel feedstock. The oxygen is removed by reacting the oxygen with the methane in the feedstock aided by the catalyst, as follows:

$$2CH_4+O_2 \rightarrow 2CO+4H_2+heat$$

$$CH_4+O_2 \rightarrow CO_2+2H_2+heat$$

The oxygen is also removed in the deoxidizer bed 304 by reacting the propane in the feedstock with oxygen, as follows:

$$C_3H_8+2O_2 \rightarrow 2CO+2CO_2+4H_2+heat$$

Removal of oxygen in the deoxidizer bed 304 prevents the deactivation of the catalyst in the pre-reforming bed 306. It also produces additional hydrogen needed to maintain a reducing environment for such catalyst.

The carbon resistant catalyst in the propane processor bed 305 is selective towards propane and propylene and promotes the conversion of propane and propylene in the fuel feedstock to methane and carbon oxides, as follows:

$$C_3H_6+2H_2O \rightarrow CO_2+2CH_4+H_2$$

$$C_3H_8+2H_2O \rightarrow CO_2+2CH_4+2H_2$$

The propane processor bed 305 enables the pre-processing assembly 108 to process commercial grade propane fuel comprising up to 5% propylene.

In the pre-reforming bed 306, the reduction of the higher hydrocarbon content in the deoxidized feedstock is aided by the catalyst and occurs by conversion of the higher hydrocarbon content into a mixture of hydrogen, carbon oxides and methane. A reduction in the lower hydrocarbon content also occurs through conversion and results in increased hydrogen and carbon oxides. Particularly, approximately 10% of the methane in the fuel is reformed to provide hydrogen for the electrochemical reaction in the fuel cell assembly. The remainder of the methane in the fuel is internally reformed in the fuel cell assembly. The following reactions exemplify the conversion processing:

$$C_nH_m+nH_2O \rightarrow nCO+(m/2+n)H_2$$

$$CH_4+H_2O \rightarrow CO+3H_2$$

$$C_3H_8+2H_2O \rightarrow CO_2+2CH_4+2H_2$$

As mentioned above, the deoxidizer bed 304 is firstly disposed in the vessel 302 in relation to the direction of the flow or flow path 301 of the fuel feedstock and to the inlet of the vessel 302. The propane processing bed 305 follows the deoxidizer bed 304 in the direction of the flow path 301 and the pre-reforming bed 306 then follows the propane processing bed 305 in the direction of the flow path 301. As was stated previously, this arrangement causes the removal of oxygen from the fuel feedstock before entering the pre-reforming bed, thereby preventing deactivation of the catalyst in the bed. The life of the pre-processing assembly 108 is thus extended.

As can also be seen from the above, the reactions in the beds 304, 305 and 306 increase the hydrogen content in the fuel feedstock. This maintains a reducing environment in the propane processing bed 305 and in the pre-reforming bed 306. In particular, back diffusion of hydrogen in the pre-reforming bed 306 provides this reducing environment, thereby allowing the assembly 108 to operate without an additional supply of hydrogen to the fuel feedstock. The amount of back diffusion of hydrogen in the bed 306 is inversely related to the space velocity of the fuel feedstock. Accordingly, maintaining a low space velocity of the fuel feedstock through the pre-reforming bed 306 is desired in order to realize sufficient hydrogen back diffusion in the bed.

As can be appreciated, the space velocity is directly proportional to the flow of the fuel through the pre-reforming bed 306 and inversely proportional to the volume of the catalyst in the pre-reforming bed 306. Accordingly, the space velocity of the fuel feedstock can be controlled by adjusting the volume of the catalyst in the pre-reforming bed 306 and/or by changing the amount of the fuel flowing through the reforming bed 306, using the following relationship:

$$SV = \frac{Fuel\ Flow\ per\ hour}{Catalyst\ Volume}$$

In addition to controlling the space velocity of the fuel feedstock, the superficial velocity of the fuel needs to be controlled for a desired amount of hydrogen back diffusion. Superficial velocity is a function of a diameter of the vessel through which the fuel is flowing. Particularly, superficial velocity is directly proportional to the fuel flow and inversely proportional to the diameter of the pre-reforming bed 306. In the pre-processing assembly 108 of the present invention, space velocities between 2,000 to 5,000 h$^{-1}$ and maximum superficial velocities of approximately 1.3 ft/s have been found desirable in operation of the pre-reforming bed 306.

Moreover, the pre-reforming bed 306 may additionally be adapted to act as a guard to trap sulfur-containing compounds present in the fuel feedstock which are not removed by the desulfurizer unit 104 of FIG. 1. In particular, the nickel in pre-reforming catalyst is suitable for trapping sulfur-containing compounds effectively. With this additional sulfur removal, the operating life of the reforming catalyst in the fuel cell assembly 112 can be increased.

The optimal design of the pre-reforming assembly 108 will depend upon the particular application. Some of the important factors to be considered are the requirements of the fuel cell assembly 112, the composition of fuel gas being processed, and the amount of gas to be treated. An illustrative example of a pre-reforming assembly 108 is described herein below.

EXAMPLE 1

The pre-processing assembly of FIG. 4 has been optimized for processing HD-5 fuel comprising propane and up to 5% propylene for use in a 300 kW Direct Fuel Cell power plant. The deoxidizer bed 304 comprises a G-74D catalyst and has a volume of 0.7 cubic feet. The propane processor bed 305 comprises an FCR-HC59 anti-carbon catalyst manufactured by Sud Chemie and has a volume of 0.75 cubic feet, and the pre-reforming bed 306 comprises a C11-PR catalyst and has a volume of 1.7 cubic feet. The vessel 302 is made from 304/310 stainless steel and has a volume of 4 cubic feet and a diameter of 20 inches.

The optimal temperatures of the fuel feedstock entering the vessel 302 through the inlet 308 are approximately 300 to 490° C. and preferably about 350° C., and the temperature of the pre-processed fuel exiting the vessel 302 through the outlet 310 is approximately 350° C. The deoxidizer bed 304 is adapted to operate at a temperature between 300° and 600° C., while the propane processor bed 305 and the pre-reforming bed 306 are adapted to operate at temperature between 300° and 540° C. The optimal operating temperature range of beds 304, 305 and 306 of the assembly 108 is between 300° C. and 400° C. The desired space velocity of the fuel feedstock flowing through the deoxidizer bed 304 is between 5,000 and 12,000 $h^{-1}$. The desired space velocity of the fuel feedstock flowing through the propane processor bed 305 is between 5,000 and 11,000 $h^{-1}$, while the desired space velocity of the fuel feedstock flowing through the pre-processing bed 306 is between 2,000 and 5,000 $h^{-1}$. In order to maintain a desired hydrogen back diffusion in the pre-reforming bed 306, the desired maximum superficial velocity of the fuel feedstock flowing through the bed 306 is 1.3 ft/s at STP conditions. Moreover, it is preferred that the steam to carbon ratio of the fuel feedstock entering the assembly is between 2.9 and 3.4, and preferably about 3.

The performance of the pre-processing assembly 108 of FIG. 4 was tested using propane fuel feedstock having various concentrations of propylene. Fuel feedstock used during these tests comprised pure propane with no propylene, HD-5 gas having 2538 ppm of propylene, and HD-5+ gas having approximately 5% propylene. The tests were performed at varied inlet temperatures of the fuel feedstock entering the assembly 108, varied space velocities and varied steam to carbon ratios.

Figure 5:
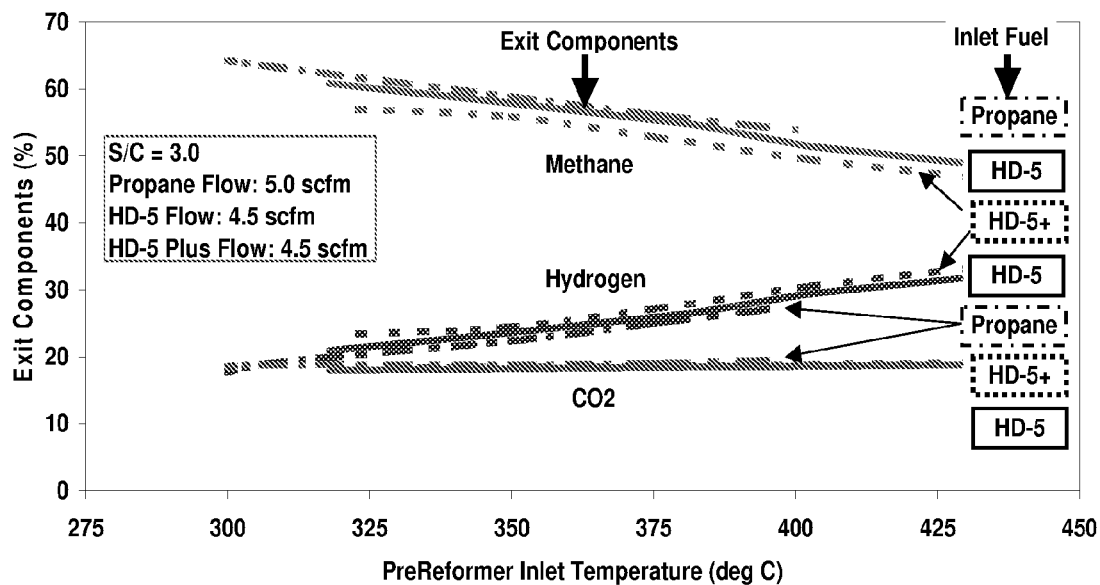
FIG. 5 shows a graph of performance data of the pre-processing assembly of FIG. 4 at different fuel feedstock inlet temperatures.

FIG. 5 shows a graph of performance data resulting from the testing of the assembly 108 of FIG. 4 at different fuel feedstock inlet temperatures. In the testing procedure, fuel feedstock was pre-heated to various temperatures before entering the assembly 108 and the concentrations of the various components of the pre-processed fuel feedstock gas exiting the assembly were measured. The fuel feedstock used during this testing had a steam to carbon ratio of 3.0. The flow rate of the pure propane fuel feedstock gas through the assembly was at 5.0 standard cubic feet per minute ("scfm"), the flow rates of the HD-5 feedstock gas and the HD-5+ fuel feedstock gas were at 4.5 scfm and the inlet temperatures of the fuel feedstock entering the assembly 108 ranged between 300 and 450° C.

The X-axis in FIG. 5 represents the pre-processing assembly inlet temperature, while the Y-axis represents the exit concentration of each of the components exiting in the pre-processed fuel feedstock gas. As shown in FIG. 5, pre-processed fuel feedstock leaving the assembly 108 included methane, hydrogen and carbon dioxide content. The respective concentrations of methane, hydrogen and carbon dioxide in the exiting pre-processed fuel feedstock gas resulting from the pure propane input feedstock are approximately the same as the respective concentrations of methane, hydrogen and carbon dioxide in the exiting pre-processed fuel feedstock gas resulting from the HD-5 and HD-5+ input feedstocks. Accordingly, these tests show that the assembly 108 is capable of pre-processing fuel feedstock with high propylene concentrations without degradation in performance.

As can also be seen, as the inlet temperature of the feedstock increased, the concentration of hydrogen in the exiting pre-processed fuel feedstock gas also increased, while the concentration of methane in the exiting pre-processed fuel feedstock gas decreased. Moreover, as shown, at all inlet temperatures the pre-processed fuel feedstock gas exiting the assembly included a sufficient concentration of hydrogen to maintain the pre-reforming catalyst in a reducing atmosphere, thus extending the operating life of the assembly 108.

The performance of the fuel processing assembly 101 of FIG. 1 using the pre-processing assembly 108 shown in FIG. 4 was also tested using different fuel feedstocks. In particular, the performance of the assembly was tested by passing HD-5 propane gas and by passing natural gas through the pre-processing assembly 108 at the same inlet temperature. The inlet temperature of each fuel feedstock was 372° C. and the fuel utilization (Uf) was 65% at 100 mA/cm$^2$ current density fuel cell operation. The composition of the gas leaving the pre-processing assembly 108 was determined for each fuel feedstock passed through the assembly 108.

Figure 6:
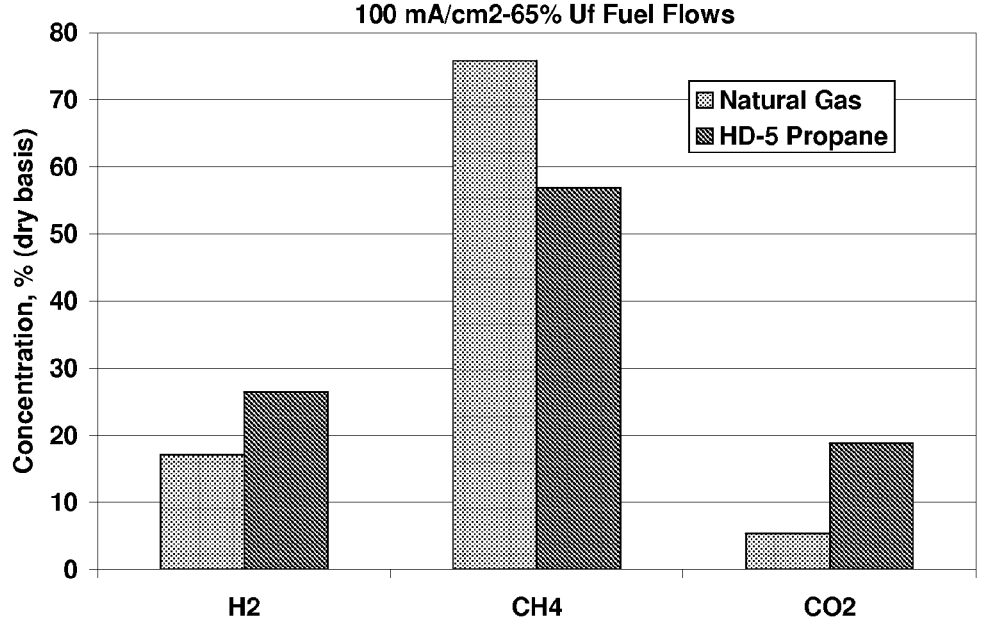
FIG. 6 shows a bar graph showing exit gas compositions for HD-5 propane gas and for natural gas pre-processed in the pre-processing assembly of FIG. 4.

FIG. 6 shows a bar graph showing exit gas compositions for HD-5 propane gas and for natural gas pre-processed in the pre-processing assembly. In FIG. 6, Y-axis represents the concentration on dry basis of each component of the gas. As shown, natural gas pre-processed by the pre-processing assembly 108 included about 17% $H_2$, 77% $CH_4$ and 6% $CO_2$ while HD-5 gas pre-processed by the pre-processing assembly 108 included about 26% $H_2$, 56% $CH_4$ and 18% $CO_2$. Thus, as can be seen in FIG. 6, the pre-processing, and in particular pre-reforming, of propane is more complete than the pre-processing of natural gas, resulting in higher concentrations of hydrogen and smaller concentrations of methane.

Figure 7A:
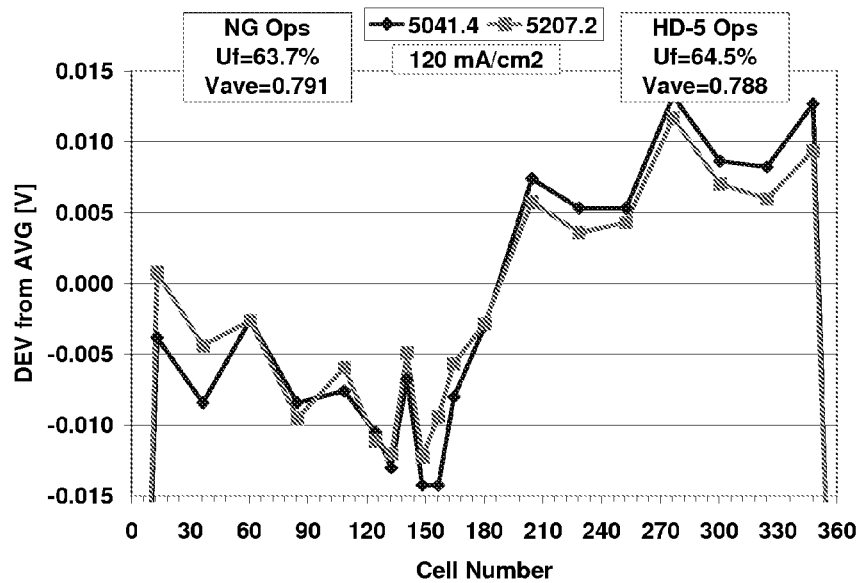
FIGS. 7A and 7B show graphs of performance data of a fuel cell assembly of FIG. 1 operating with natural gas as compared with the performance data of the fuel cell assembly of FIG. 1 operating with propane and propane spiked with propylene fuels, respectively.
Figure 7B:
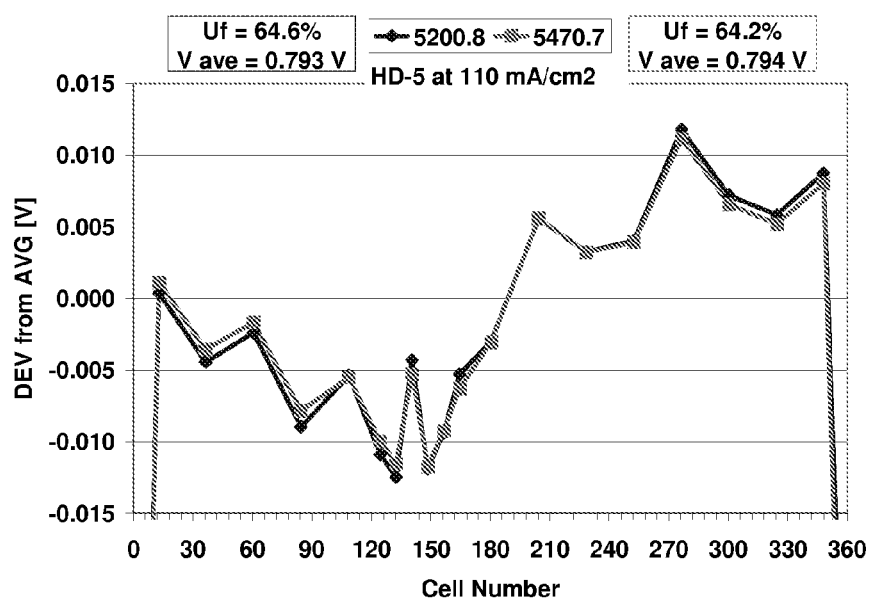

Finally, the performance of the fuel cell assembly 112 was tested with different fuel feedstocks, processed by the fuel processing assembly 101 of FIG. 1. FIGS. 7A and 7B show graphs of performance data of the fuel cell assembly operating with natural gas as compared with the performance data of the fuel cell assembly operating with HD-5 propane and HD-5+ propane spiked with propylene feedstocks, respectively. In FIGS. 7A and 7B, the X-axis represents the numbers of the fuel cells in the fuel cell assembly 112 while the Y-axis represents the voltage deviation from average voltage for each of the fuel cells. As can be appreciated, the performance of the fuel cell assembly improves as the voltage deviation decreases.

When the performance of the fuel cell assembly 112 operating with natural gas was compared with the performance of the fuel cell assembly 112 operating with HD-5 propane gas, as summarized in FIG. 7A, the fuel utilization Uf for the natural gas was 63.7% and the average voltage was 0.791 V, while the fuel utilization Uf for the HD-5 gas was 64.5% and the average voltage was 0.788 V. As can be seen from FIG. 7A, the voltage deviation in the fuel cell assembly 112 operating with HD-5 gas is either similar to or smaller than the voltage deviation of the assembly operating with natural gas. Thus, the performance of the fuel cell assembly 112 is equivalent or better with pre-processed HD-5 gas as compared to the performance of the assembly 112 using pre-processed natural gas. Accordingly, the fuel cell system 101 of the invention is capable of achieving similar fuel cell assembly 112 performance using either HD-5 fuel or natural gas. Due to similar performance with both fuels (natural gas and HD-5), the fuel cell assembly 112 can be operable with both fuels and can be interchanged whenever needed as dual fuel operation. The transition from one fuel to other fuel can be processed within <1 minute and this interchangeability has been demonstrated by on the fly transition from one fuel to other.

When the performance of the fuel cell assembly 112 operating with natural gas was compared with the performance of the fuel cell assembly 112 operating with HD-5+ propane gas spiked with propylene, as summarized in FIG. 7B, the fuel utilization Uf for the natural gas was 64.6% and the average voltage was 0.793 V, while the fuel flow utilization of the HD-5+ gas was 64.2% and the average voltage was 0.794 V. As in FIG. 7A, the fuel cell assembly performance with HD-5+ gas, as shown in FIG. 7B, is similar to the assembly performance with natural gas. From the results shown in FIGS. 7A and 7B, it can be seen that the performance of the fuel cell assembly remains the same or is improved when the assembly 112 operates with HD-5 propane or HD-5+ propane spiked with propylene fuels processed by the processing assembly 101. The processing assembly 101 of the invention, thus allows a greater variety of fuel feedstocks to be utilized by the fuel cell assembly 112 without degradation in performance.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention.

We claim:

1. A fuel cell system including:
    a fuel cell assembly; and
    the fuel supply assembly for receiving a supply of liquid fuel feedstock including hydrocarbons having higher and lower hydrocarbon content and high molecular weight sulfur-containing compounds, the higher hydrocarbon content and high molecular weight sulfur containing compounds being less volatile that the lower hydrocarbon content, the fuel supply assembly supplying fuel to said fuel cell assembly and comprising:
    a housing unit adapted to house said liquid fuel feedstock so that the liquid fuel feedstock is subjected to vaporization conditions to allow at least a portion of said liquid fuel feedstock to vaporize to form fuel feedstock vapor, the vaporization conditions being such that the concentration of lower hydrocarbon content is higher and the concentration of higher hydrocarbon content and high molecular weight sulfur containing compounds is lower in said fuel feedstock vapor than in said liquid fuel feedstock;
    a collecting unit having a first end coupled with said housing unit and a second end adapted to be coupled with said fuel cell assembly, said collecting unit collecting said fuel feedstock vapor from said housing unit to make said fuel feedstock vapor available to said fuel cell assembly.

2. A fuel cell system in accordance with claim 1, wherein: said liquid fuel feedstock comprises a propane containing liquid fuel feedstock, wherein propane is included in the lower hydrocarbon content.

3. A fuel cell system in accordance with claim 2, wherein said fuel cell system includes a pre-heater and humidifier assembly for combining said fuel feedstock vapor with input water to provide a humidified fuel feedstock vapor having a predetermined steam to carbon ratio and for pre-heating said humidified fuel feedstock vapor to a predetermined temperature.

4. A fuel cell system in accordance with claim 3, wherein said predetermined steam to carbon ratio is about 3.

5. A fuel cell system in accordance with claim 4, wherein said predetermined temperature is about 320° C.

6. A fuel cell system in accordance with claim 5, wherein said fuel cell assembly further comprises a desulfurizer having an inlet coupled with said second end of said collecting unit of said fuel supply assembly and an outlet coupled with said humidifying and pre-heating assembly, said desulfurizer receiving fuel feedstock vapor from said collecting unit and removing sulfur-containing compounds from said fuel feedstock vapor.

7. A fuel cell system in accordance with claim 6, wherein said fuel cell assembly further comprises a pre-processing assembly receiving humidified pre-heated fuel feedstock vapor from said humidifying and pre-heating assembly, said pre-processing assembly being adapted to pre-reform said fuel feedstock vapor so as to reduce said propane and said hydrocarbons having a higher hydrocarbon content in said fuel feedstock vapor to provide hydrogen and hydrocarbons having a lower hydrocarbon content.

8. A fuel cell system in accordance with claim 7, wherein said fuel cell assembly receives pre-reformed fuel feedstock vapor after passage through said pre-processing assembly.

9. A fuel cell system in accordance with claim 8, wherein said fuel supply assembly further comprises a drawing unit coupled with said housing unit for drawing said liquid fuel feedstock from said housing unit.

10. A fuel cell system in accordance with claim 9, wherein said fuel supply assembly further comprises: a flow stabilizer unit for maintaining a predetermined vapor pressure and vaporization rate in said housing unit, said flow stabilizer unit having an inlet coupled with said drawing unit and an outlet coupled with said housing unit;
    and said drawing unit comprises a fuel flow control member for controlling the flow of said liquid fuel feedstock drawn by said drawing unit from said housing unit to said flow stabilizer such that no liquid fuel feedstock flows to said fuel flow stabilizer unit during drawing of said liquid fuel feedstock by said drawing unit for rinsing of said housing unit.

11. A fuel cell system in accordance with claim 10, wherein said drawing unit draws substantially all the liquid fuel feedstock from said housing unit to rinse said housing unit if the level of liquid fuel feedstock in said housing unit reaches a predetermined level.

12. A fuel cell system in accordance with claim 11, wherein said predetermined level is 20% of a volume of said housing unit.

13. A fuel cell system in accordance with claim 1, wherein said fuel supply assembly further comprises a drawing unit coupled with said housing unit for drawing liquid fuel feedstock from said housing unit.

14. A fuel cell system in accordance with claim 13, wherein said fuel supply assembly further comprises a flow stabilizer unit for maintaining a predetermined vapor pressure and vaporization rate in said housing unit, said flow stabilizer unit having an inlet coupled with said drawing unit and an outlet coupled with said housing unit.

15. A fuel cell system in accordance with claim 14, wherein said flow stabilizer unit includes a heating unit.

16. A fuel cell system in accordance with claim 14, wherein said drawing unit comprises a fuel flow control member for controlling the flow of said liquid fuel feedstock drawn by said drawing unit from said housing unit to said flow stabilizer such that no fuel feedstock flows to said fuel flow stabilizer unit during drawing of said liquid fuel feedstock by said drawing unit for rinsing of said housing unit.

17. A fuel cell system in accordance with claim 16, wherein said drawing unit draws substantially all the liquid fuel feedstock from said housing unit to rinse said housing unit if the level of liquid fuel feedstock in said housing unit reaches a predetermined level or less.

18. A fuel cell system in accordance with claim 17, wherein said predetermined level is 20% of a volume of said housing unit.

19. A fuel cell system in accordance with claim 13, wherein said drawing unit draws substantially all the liquid fuel feedstock from said housing unit to rinse said housing unit if the level of liquid fuel feedstock in said housing unit reaches a predetermined level or less.

20. A fuel cell system in accordance with claim 19, wherein said predetermined level is 20% of a volume of said housing unit.

21. A fuel cell system in accordance with claim 1, wherein said fuel supply assembly further comprises a heating unit for heating said liquid fuel feedstock.

22. A method for use with a fuel cell assembly and with a liquid fuel feedstock including hydrocarbons having higher and lower hydrocarbon content and high molecular weight sulfur-containing compounds, the higher hydrocarbon content and high molecular weight sulfur containing compounds being less volatile that the lower hydrocarbon content, the method comprising:
   subjecting said liquid fuel feedstock to vaporization conditions to allow at least a portion of said liquid fuel feedstock to vaporize to form fuel feedstock vapor, the vaporization conditions being such that the concentration of lower hydrogen content is higher and the concentration of higher hydrocarbon content and high molecular weight sulfur containing compounds is lower in said fuel feedstock vapor than in said liquid fuel feedstock; and
   collecting said fuel feedstock vapor to make said fuel feedstock vapor available to said fuel cell assembly.

23. A method in accordance with claim 22, wherein:
   said liquid fuel feedstock comprises a propane containing liquid fuel feedstock, wherein propane is included in the lower hydrocarbon content.

24. A method in accordance with claim 23, further comprising;
   maintaining a predetermined vapor pressure and vaporization rate of the liquid fuel feedstock.

25. A method in accordance with claim 24, further comprising:
   containing said liquid fuel feedstock in a housing unit; and
   said step of maintaining comprises removing liquid feedstock from said housing unit and returning said removed liquid feedstock to said housing unit; and
   said method further comprises:
   removing all said liquid fuel feedstock from said housing unit while ceasing said maintaining if a level of said fuel feedstock reaches a predetermined level or less.

26. A method in accordance with claim 23, further comprising:
   combining said fuel feedstock vapor with input water to provide a humidified fuel feedstock vapor having a predetermined steam to carbon ratio, and
   pre-heating said humidified fuel feedstock vapor to a predetermined temperature.

27. A method in accordance with claim 26, wherein said predetermined steam to carbon ratio is 3 and said predetermined temperature is about 320° C.

28. A method in accordance with claim 26, further comprising removing sulfur-containing compounds from said fuel feedstock vapor before humidifying and pre-heating said fuel feedstock vapor.

29. A method in accordance with claim 28, further comprising pre-reforming said humidified fuel feedstock vapor to reduce said propane and said hydrocarbons having a higher hydrocarbon content and to produce hydrocarbons having a lower hydrocarbon content and hydrogen for use in a fuel cell.

30. A method in accordance with claim 24, wherein said maintaining a predetermined vapor pressure and vaporization rate of the liquid fuel feedstock comprises heating said liquid fuel feedstock.

* * * * *